T. J. MARINUS & J. & W. WHAIT.

Wheel-Harrow.

No. 58,854.

Patented Oct. 16. 1866.

Witnesses:
W. H. Burridge
Frank Alden

Inventors:
T. J. Marinus
James Whait
Wm Whait

UNITED STATES PATENT OFFICE.

T. J. MARINUS, JAMES WHAIT, AND WILLIAM WHAIT, OF INDEPENDENCE, IOWA.

IMPROVEMENT IN CARRIAGE-HARROWS.

Specification forming part of Letters Patent No. 58,854, dated October 16, 1866.

*To all whom it may concern:*

Be it known that we, T. J. MARINUS, JAMES WHAIT, and WILLIAM WHAIT, of Independence, in the county of Buchanan and State of Iowa, have invented certain new and useful Improvements in Carriage-Harrows; and we do hereby declare that the following is a full and complete description of the construction and operation of the same, reference being had to the accompanying drawings, making part of this specification, in which—

Figure 1:
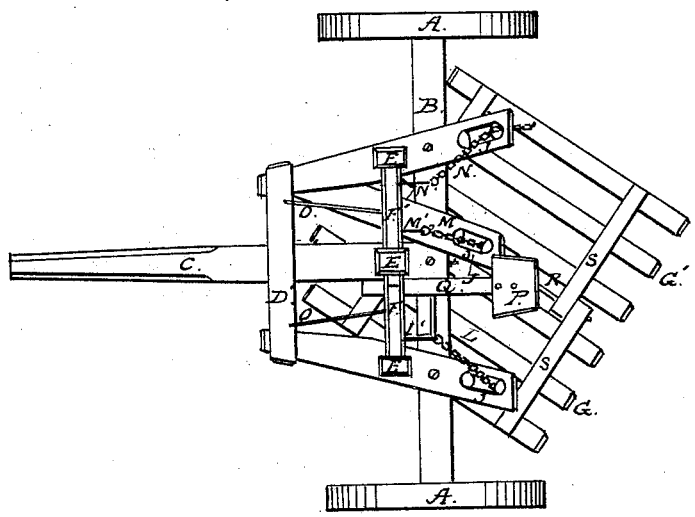
Figure 2:
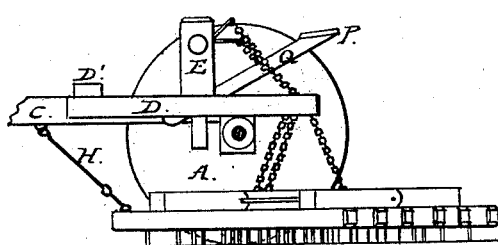
Figure 3:
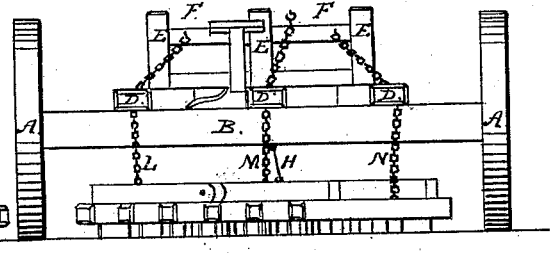

Figure 1 is a top view. Fig. 2 is a side view, and Fig. 3 is a rear view.

Like letters refer to like parts.

A A represent the wheels, which may be made in the usual form of carriage-wheels, and B represents the axle-tree.

C represents the tongue, and D D the hounds, which are secured together at their forward ends by the bar D', and bolted to the axle-tree, and with the tongue, which is also bolted to the axle-tree, constitute the frame of the carriage.

E E E represent three posts that rise from the frame just forward of the axle-tree. These posts support the rock-shafts F F', which are journaled in the posts.

G G' represent two harrows, each of which is composed of three parallel bars of timber about four inches square, and from four to six feet in length. The width of each section is about three feet. The middle bar of section G projects forward some eight or ten inches, thereby forming a point of attachment for the supporting-link H, as shown in Fig. 2.

At the rear end of each piece D, and also at the rear end of the diagonal piece D', which is bolted to the axle-tree B, are placed grooved pulleys I, over which pass the chains L M N that support the rear end of the harrow, the chain L being attached to the section G, and the chains M N supporting the section G'. The upper end of the chain L is attached to an arm, L', which projects backward from the rock-shaft F, and the chains M N are attached to arms M' and N', which project from the shaft F' in like manner.

Both the rock-shafts are operated by means of the rods or levers O. (Shown in Fig. 1.) By depressing these levers the harrows are raised from the ground and suspended between the wheels, and by elevating them the harrows are caused to rest upon the ground.

P represents the driver's seat, which is supported upon the arm Q.

The two sections of the harrow are hinged together by means of a round rod, R, which passes through the inner ends of the stay-bars S, as shown in Fig. 1.

What we claim as our improvement, and desire to secure by Letters Patent, is—

The harrows G G', in combination with the wheels A A and frame C D D', rock-shaft F F', supporting-link H, and chains L M N, when the several parts are constructed and operated in the manner and for the purpose set forth.

T. J. MARINUS.
    JAMES WHAIT.
    WM. WHAIT.

Witnesses:
 W. H. BURRIDGE,
 FRANK ALDEN.